D. C. LARSON.
ELECTRIC WELDING OF ALTERNATING CURRENT MOTORS.
APPLICATION FILED MAY 28, 1918.
1,361,075. Patented Dec. 7, 1920.
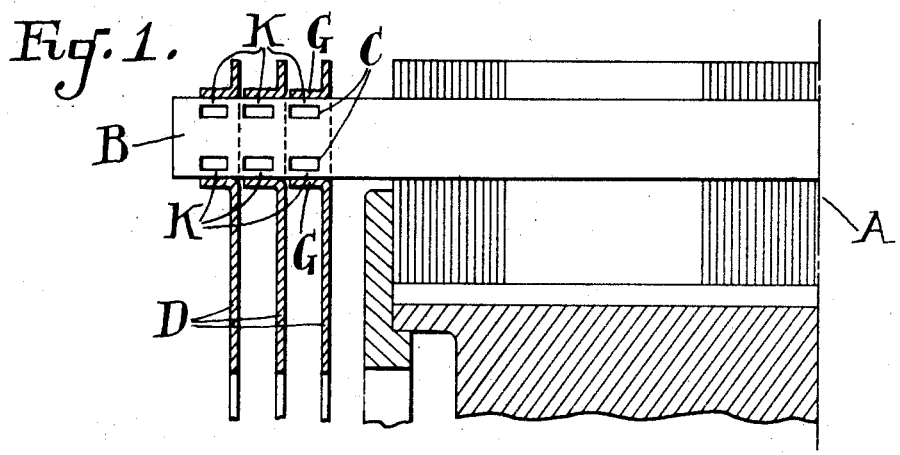
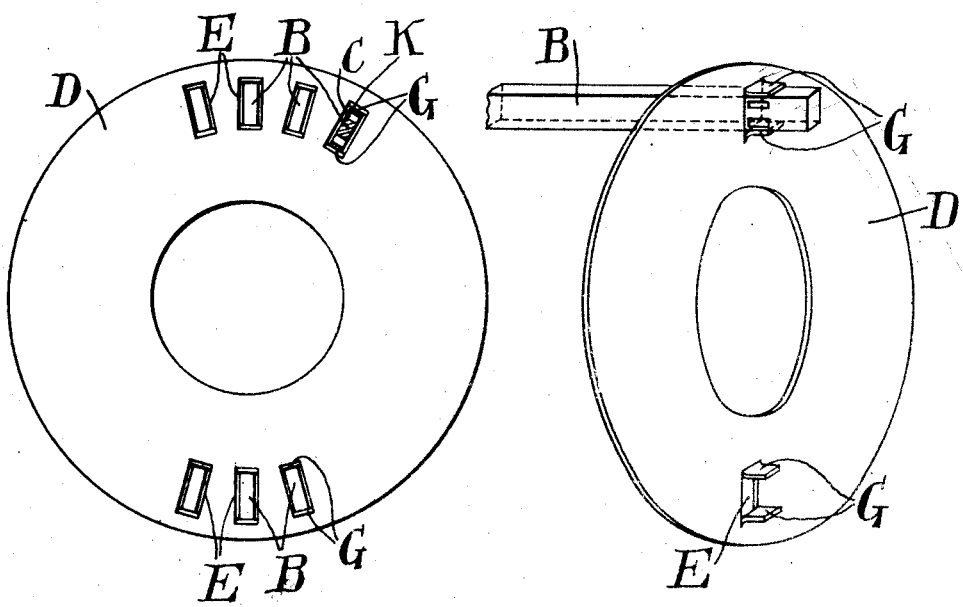

UNITED STATES PATENT OFFICE.

DAVID C. LARSON, OF YONKERS, NEW YORK, ASSIGNOR TO OTIS ELEVATOR COMPANY, OF JERSEY CITY, NEW JERSEY, A CORPORATION OF NEW JERSEY.

ELECTRIC WELDING OF ALTERNATING-CURRENT MOTORS.

1,361,075.  Specification of Letters Patent.  Patented Dec. 7, 1920.

Application filed May 28, 1918. Serial No. 237,003.

*To all whohm it may concern:*

Be it known that I, DAVID C. LARSON, a citizen of the United States, residing in Yonkers, in the county of Westchester and State of New York, have invented a new and useful Improvement in Electric Welding of Alternating-Current Motors, of which the following is a specification.

My invention relates to alternating current motors and has for its object to provide, first, as an article of manufacture, a rotor for an alternating current motor, having improved electrically welded joints or connections between the rotor inductor bars and their short-circuiting or end rings; and second, an improved method of preparing the said elements (which may be of two different kinds of metals whose resistance values differ considerably) for electric welding, so that the current carrying areas of the two metals at the points where they are jointed will be proportioned or it may be said adjusted to have such relative values of ohmic resistance as will cause the heat generated by the welding current to produce in each metal at the joint a temperature rise, the relative values of which are substantially alike.

In the accompanying drawing, Figures 1, 2 and 3, illustrate different views of inductor bars of an alternating current rotor, together with the short-circuiting or end rings, as prepared according to the present method.

A core A of the rotor may be of any well-known or standard construction provided with inductor bars B, which may be of copper and rectangular in cross section; the short-circuiting or end rings D may be in the form of disks, of which there may be provided one or more as may be desired, and may be of sheet iron, or any other current resisting material having an ohmic resistance value approximating that of the sheet iron disks herein disclosed.

According to the present method, openings E are stamped or punched in the sheet iron disk, which permits the positioning of the latter by sliding it over the ends of the bars. The metal so stamped from the disk forms laterally projecting lips G, at the top and bottom of each slot, which lips are adapted to be electrically welded to the top and bottom edges of the inductor bars.

Coming now to a most valuable and important feature of my invention, it will be pointed out that in order successfully to join or connect two pieces of metal by the process of electric welding, it is necessary that they each heat-up at the joint a like amount, or in other words, have a temperature rise whose relative values are substantially alike. Thus in considering the case at hand, since the conductivity of heat and current by the copper bar is many times that of the sheet iron disk or lip G, the current necessary to generate sufficient heat in the copper bar to form a weld, would be greatly in excess of that which the sheet iron lip G would stand and would melt the latter. Thus to overcome this difficulty and so enable these two metals to be electrically welded, current carrying areas or strips are provided on the copper bar at the points where the joints are formed with the lips G, which in effect increases the resistance of the copper bar at the joint and by so doing cause the heat generated therein by the welding current to produce a temperature rise substantially equal to that of the sheet iron lips G. These current carrying areas are provided by punching rectangular openings in the bar, near its edges, as at C so as to form current carrying strips K, of such reduced cross-sectional area and ohmic resistance value as will cause the heat generated therein by the welding current to produce a temperature rise substantially equal to that of the sheet iron lips.

In carrying out the electric welding operation, the lips G bearing on the strips K, are clamped between the jaws of an electric welding machine which may be of any well-known type such as is now commonly employed for electric spot welding.

In order to prevent sagging or other damage to the strips K, due to the pressure exerted by the welding clamp, a heat resisting filler, such for example as plaster of Paris, is provided in each opening, this serving effectually to retain the strips in proper shape and insuring a good electrical contact at the joint.

At the start of the welding operation, it is preferable to pre-heat the joints by applying a relatively low current to allow the metals at the joint to become packed or set, thereby insuring good contact between these parts and eliminating danger of their burning up when the heavy current is applied actually to form the weld.

It will be pointed out that only a single joint may be provided between a copper bar and the sheet iron disk, instead of a double joint as shown, a single joint involving the provision of only one lip G for each bar and one strip K.

Having thus described the invention, what I claim as new and desire to secure by Letters Patent of the United States is:—

1. In the electric motor art, the method of preparing inductor bars of an alternating current rotor and end rings to be jointed by the process of electric welding, consisting in providing each of the said members with a strip, the strips having absolutely such relative values of ohmic resistance as will cause the generation of heat by the welding current to produce, in each of the members at the joint, a temperature rise, the relative values of which are substantially alike.

2. In the electric motor art, the method of preparing inductor bars of an alternating current rotor and end rings to be jointed by the process of electric welding, consisting in providing the end ring with a lip projecting laterally from the body of the end ring, and providing a strip of reduced area on the inductor bar by perforating the bar, the lip and the strip forming the joint and having such relative values of ohmic resistance as will cause the generation of heat by the welding current to produce a temperature rise of substantially like values.

3. In the electric motor art, the method of preparing a rectangular shaped inductor bar of an alternating current rotor, and an end ring in the form of a disk, consisting in punching an opening in the disk to fit the inductor bar, forming a laterally projecting lip of the metal so punched out, and punching an opening in the inductor bar to form a strip which together with the said lip form a joint adapted to be included in the electrical circuit of the welding machine.

4. In the electric motor art, the method of preparing a rectangular shaped inductor bar of an alternating current rotor and an end ring in the form of a disk, consisting in punching an opening in the disk to fit the inductor bar, forming a laterally projecting lip from the metal so punched out, forming a strip of reduced area in the inductor bar by punching therein a rectangular opening, the said strip and said lip forming a joint adapted to be included in the electrical circuit of the welding machine, and providing a heat resisting filler in the said opening.

5. In the electric motor art, the method of preparing an inductor bar of an alternating current rotor, consisting in punching an opening in the inductor bar to form a strip of reduced area, and in providing a heat resisting filler in the said opening for the purpose substantially as described.

6. An article of manufacture consisting of an alternating current rotor comprising an inductor bar having a strip of reduced area, and a metallic disk having a lip, the lip and strip being jointed together by the process of electric welding.

7. An article of manufacture consisting of an alternating current rotor comprising a number of copper inductor bars, and a plurality of sheet iron disks having openings to fit the bars, formed by punching a lip out of the sheet, the disks being spaced apart from each other, by flattening the lip outwardly, which serves as a spacer, the portion of the bars between the disks being perforated and serving as a fan in effect to circulate air to aid in cooling the rotor windings, the lips and bars being electrically welded together.

In testimony whereof, I have signed my name to this specification.

DAVID C. LARSON.